(12) United States Patent
Saito et al.

(10) Patent No.: US 6,349,838 B1
(45) Date of Patent: Feb. 26, 2002

(54) PLASTIC BOTTLE AND METHOD OF PRODUCING THE SAME

(75) Inventors: Go Saito; Yoshitsugu Maruhashi; Kiyoshi Kawaguchi; Makoto Etoh, all of Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 09/452,835

(22) Filed: Dec. 2, 1999

(30) Foreign Application Priority Data

Dec. 25, 1998 (JP) ............................................ 10-370886

(51) Int. Cl.⁷ ............................................... B65D 90/02
(52) U.S. Cl. ........................ 215/371; 215/374; 264/255; 264/521
(58) Field of Search ................................ 215/371–377; 264/532, 255, 521, 513

(56) References Cited

U.S. PATENT DOCUMENTS

| | | | | |
|---|---|---|---|---|
| 4,155,974 A | * | 5/1979 | Valyi | 264/513 |
| 4,318,882 A | * | 3/1982 | Agrawal et al. | 264/521 |
| 4,497,855 A | * | 2/1985 | Agrawal et al. | 264/521 |
| 4,529,372 A | * | 7/1985 | Saumsiegle | 425/528 |
| 4,725,219 A | * | 2/1988 | Jakobsen et al. | 425/393 |
| 5,762,854 A | * | 6/1998 | Valyi | 264/255 |

\* cited by examiner

Primary Examiner—Allan N. Shoap
Assistant Examiner—Tri M. Mai
(74) Attorney, Agent, or Firm—Sughrue Mion, PLLC

(57) ABSTRACT

A bottle having substantially no strain due to fluidized orientation in the bottom portion thereof which is homogeneously and uniformly drawn, and, as a result, exhibiting improved shock resistance and buckling strength in the bottom portion, featuring excellent resistance against environmental cracking at the center in the bottom portion, without developing crazing or whitening during the preservation, and offering excellent appearance. The bottle is formed by biaxially stretch-blow-molding a thermoplastic resin, and has a mouth portion, a shoulder portion, a barrel portion and a bottom portion, said bottom portion without being substantially affected by the residual strain due to orientation by fluidization.

4 Claims, 10 Drawing Sheets

RESULTS OF X-RAY MEASUREMENT 2

UPPER MOLD DESCENDS
MOLDING STARTS
COMPLETION OF MOLDING

PLASTIC BOTTLE AND METHOD OF PRODUCING THE SAME

BACKGROUND OF THE INVENTION

1. Field of the Invention

The present invention relates to a bottle formed by biaxially stretch-blow-molding a thermoplastic resin and to a method of producing the same. More particularly, the invention relates to a bottle that is particularly oriented in the bottom portion thereof and has excellent resistance against environmental stress (ESC), shock resistance, strength and appearance in the bottom portion thereof, and to a method of producing the same.

2. Description of the Prior Art

Stretch-blow-molded plastic containers composed of polyesters or polypropylenes and, particularly, polyester containers have nowadays been widely used for containing liquid products such as liquid detergents, shampoos, cosmetics, sauces such as soy sauces, etc., as well as for containing aerated beverages such as beer, Coke, cider, etc., for the other containing beverages such as juices, mineral water, etc. and have also been used as cups for containing desserts, miso and other foods, owing to their excellent transparency and suitable degree of gas barrier property.

The methods of producing polyester bottles can be roughly divided into the hot parison method and the cold parison method. According to the former hot parison method, the preform formed by injection-molding the polyester is stretch-blow-molded in a hot state without being completely cooled. According to the latter cold parison method, on the other hand, a polyester is injection-molded to, first, form an overcooled preform with bottom of amorphous polyester having a size considerably smaller than a final container, the preform is pre-heated at a stretching temperature, and is stretched in the axial direction in a blowing metal mold and is stretched by blowing in the circumferential direction.

The preform with bottom has a mouth-and-neck portion corresponding to the mouth-and-neck portion of a container and a cylindrical portion with bottom that is stretch-blow-molded, and generally has the shape of a test tube as a whole when the container is a vertically elongated one. In the mouth-and-neck portion, for example, are formed an open end for being sealed and a means for engagement with a closure. In the bottom is further necessarily formed a gate portion that protrudes outward from the center of the bottom for conducting the injection-molding.

In the polyester bottles that have heretofore been stretch-blow-molded, the orientation and crystallinity are most disturbed in the bottom portion of the bottle and, particularly, at the central portion thereof, causing problems such as deteriorated appearance and drop in the bottle properties.

For instance, even though the barrel portion of the PET bottle is completely transparent, the gate portion and the peripheries thereof of the preform are often whitened as generally called gate whitening. It has been said that this phenomenon occurs since the PET resin that is distorted due to orientation by fluidization has a property of being very easily crystallized.

In order to prevent the gate whitening, the molding must be conducted under the conditions where the residual strain due to fluidization does not increase. For example, it has been known that the gate whitening takes place little as the gate diameter increases or as the injection pressure decreases.

As the gate diameter increases, however, the diameter of the remaining portion of the gate increases, too, in the bottom portion of the bottle deteriorating the appearance. As the injection pressure decreases, further, the preform is poorly molded and the injection retention time is lengthened, resulting in a decrease in the productivity.

SUMMARY OF THE INVENTION

The present inventors have discovered that the strain due to orientation by fluidization taking place at the time of injection-molding the preform still adversely affects the bottom portion of the bottle being uniformly and homogeneously stretched, adversely affects the resistance against cracking due to environmental stress and the strength of the bottle even when the strain due to orientation by fluidization is on such a low level that does not cause the gate whitening.

The object of the present invention is to provide a bottle without substantially strain due to orientation by fluidization in the bottom portion, the bottom portion being uniformly and homogeneously stretched, having improved shock resistance and buckling strength, having excellent resistance against cracking due to environment at the center of the bottom portion, without developing crazing or whitening during the preservation, and exhibiting excellent appearance.

According to the present invention, there is provided a bottle formed by biaxially stretch-blow-molding and having a mouth portion, a shoulder portion, a barrel portion and a bottom portion, said bottom portion without being substantially affected by the residual strain due to orientation by fluidization.

In the present invention, it is desired that:
(1) the bottle is formed by biaxially stretching-blow-molding a preform that is formed by compression-molding a thermoplastic resin;
(2) the preform has a difference (tmax—tmin) between a maximum thickness and a minimum thickness in the barrel portion thereof in the circumferential direction, which is not larger than 0.07 mm;
(3) when the bottle is composed of a thermoplastic polyester, the central portion in the bottom portion of the bottle has a diffuse scattering peak in 2 θ of from 19.45 to 20.50° as measured by using X-rays (Cu-α) falling in the direction of thickness of the container wall, a peak position (A) at a portion on the outer surface side of the central portion in the bottom portion is an angle lower than that of a peak position (B) at a portion on the inner surface side of the central portion in the bottom portion, the difference (B−A) thereof is not smaller than 0.15 degrees, a half-value width (C) of the diffuse scattering peak of X-rays in the portion on the outer surface side at the central portion in the bottom portion is larger than a half-value width (D) of the diffuse scattering peak of X-rays in the portion on the inner surface side at the central portion in the bottom portion, and the difference (C−D) thereof is not smaller than 0.10 degrees; and
(4) the mouth portion has a support ring, and an annular groove is formed in the inner peripheral edge in the lower surface of the support ring.

According to the present invention, there is further provided a method of producing a bottle by biaxially stretch-blow-molding a pre-molded article for blow molding that is obtained through the steps of:

extruding a molten thermoplastic resin and cutting it into a mass of melt of nearly a predetermined amount; arranging a male metal mold and a female metal mold so as to move relative to each other and supplying the mass of melt into the metal mold;

compression-molding the mass of melt into a pre-molded article having a barrel portion with bottom and an annular groove formed in the inner peripheral edge in the lower surface of the support ring; and cooling and solidifying the compression-molded article and discharging the molded article out of the metal mold.

According to the method of the present invention, it is desired that:

(5) the mass of melt is compression-molded into a pre-molded article while discharging the air remaining in the metal mold;

(6) fine gaps or holes are formed in a portion of the metal mold forming the bottom portion of the pre-molded article; and (7) the male metal mold is constituted by a core metal mold and a follower metal mold surrounding the core metal mold and is allowed to be opened and closed coaxially therewith, the barrel portion with bottom is molded by the core metal mold and the female metal mold, and the mouth portion is molded by the core metal mold and the follower metal mold.

DETAILED DESCRIPTION OF THE PREFERRED EMBODIMENTS

Figure 1:
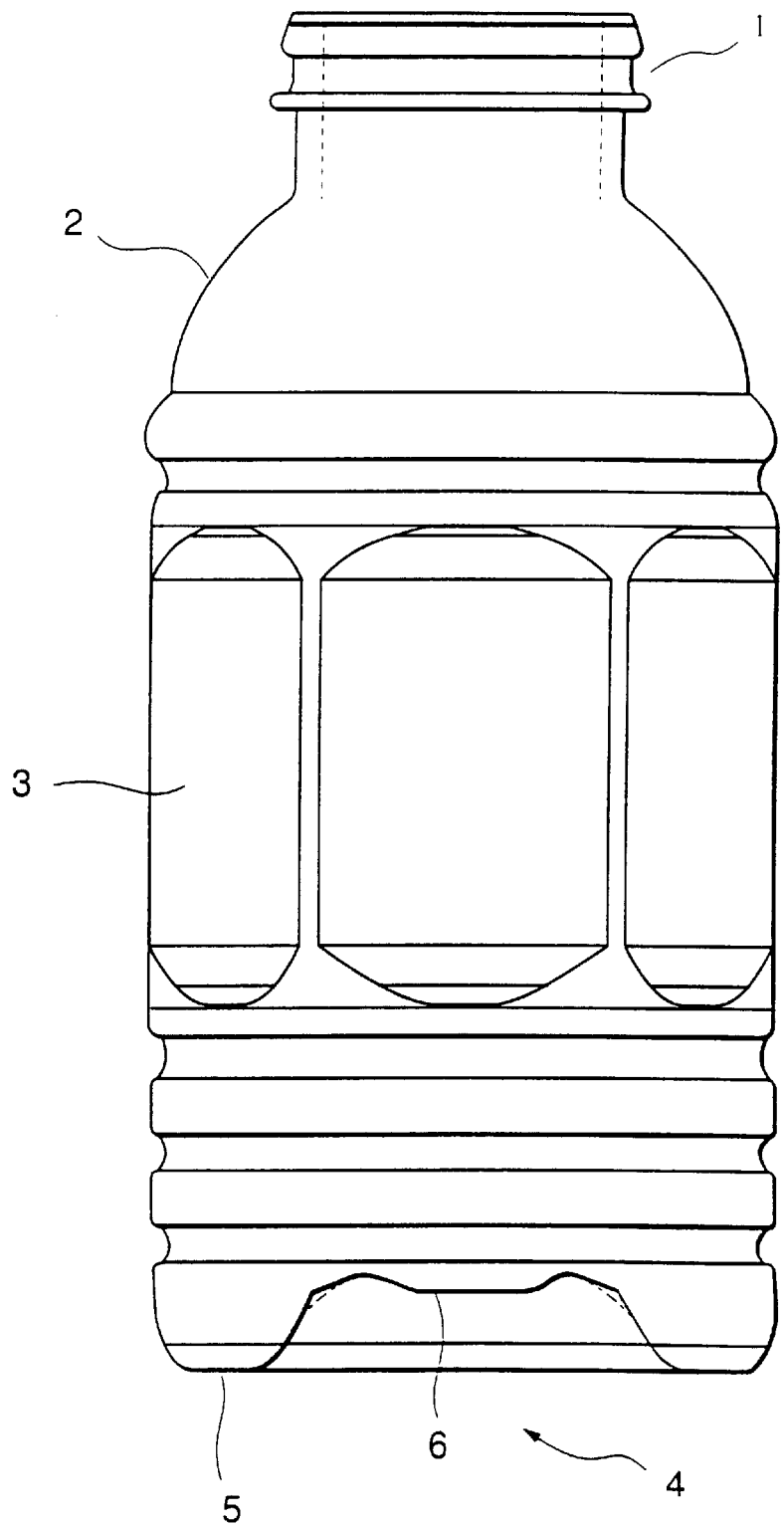
FIG. 1 is a side view illustrating a bottle according to the present invention.

Referring to FIG. 1 illustrating a bottle of the present invention, the bottle includes a mouth-and-neck portion 1, a shoulder portion 2 continuous to the mouth-and-neck portion, a barrel portion 3 and a bottom portion 4 that are formed by biaxially stretch-blow-molding a thermoplastic resin. In this embodiment, the bottom portion 4 has a self-standing structure and includes an annular grounding portion 5 in the periphery of the bottom portion and a central dome portion 6 swelling upward. A remarkable feature resides in that the center 7 in the bottom portion of the bottle is not substantially affected by the residual strain due to orientation by fluidization (has substantially no residual strain due to orientation by fluidization).

In the polyester bottle obtained from a preform formed by the conventional injection molding as pointed out already, strain due to orientation by fluidization necessarily remains at the center in the bottom portion inherent from the remaining portion of the gate, and the residual strain adversely affect properties, resistance and appearance of the bottle.

In an extreme case, the strain due to orientation by fluidization can be confirmed by a phenomenon called gate whitening. In other cases, no means has been known for effectively detecting the strain.

The present inventors have succeeded in detecting the strain due to orientation by fluidization at the center in the bottom portion of the bottle, and have formed a preform by subjecting the thermoplastic resin such as polyester or polypropylene to the compression molding and, particularly, to the one-stage compression molding in a manner that no strain due to orientation by fluidization is substantially produced, and have subjected the preform to the biaxial stretch-blow-molding in order to produce a bottle having a bottom portion that is uniformly and homogeneously stretched, having less strain due to orientation by fluidization in the bottom portion, and, hence, exhibiting improved shock resistance and buckling strength in the bottom portion, excellent resistance against the environmental cracking at the center of the bottom portion, developing little crazing or whitening during the preservation, and offering excellent appearance.

According to the study conducted by the present inventors, the strain due to orientation by fluidization at the center in the bottom portion of the bottle can be detected as the presence of the oriented mesophase in the direction of thickness at the central portion in the bottom portion.

It has been known that the thermoplastic polyester as typically represented by a polyethylene terephthalate (PET) contains oriented mesophase in addition to amorphous phase and crystalline phase (Journal of Japanese Academy of Fibers, Vol. 40, No. 6, 1984, pp. 49–56).

That is, in the crystalline phase of PET, regularity can be recognized in the arrangement of benzene rings in the molecules. In the oriented mesophase, however, there is no regularity in the arrangement of benzene rings but a periodic structure is recognized in the orientation in the direction of fiber axes. In the case of the oriented fiber, the periodic structure is detected as a peak in the X-ray diffuse scattering at $2\theta=21°$ in the X-ray diffraction.

When the bottle of the present invention is composed of a polyester resin, the bottle exhibits such X-ray diffraction characteristics that the central portion in the bottom portion of the bottle has a diffuse scattering peak in $2\theta$ of from 19.45 to 20.50 as measured by using X-rays (Cu-α) falling in the direction of thickness of the container wall, a peak position (A) at a portion on the outer surface side of the central portion in the bottom portion is an angle lower than that of a peak position (B) at a portion on the inner surface side of the central portion in the bottom portion, the difference (B–A) thereof is not smaller than 0.15 degrees, a half-value width (C) of the diffuse scattering peak of X-rays in the portion on the outer surface side at the central portion in the bottom portion is larger than a half-value width (D) of the diffuse scattering peak of X-rays in the portion on the inner surface side at the central portion in the bottom portion, and the difference (C–D) thereof is not smaller than 0.10 degrees.

Figure 2:
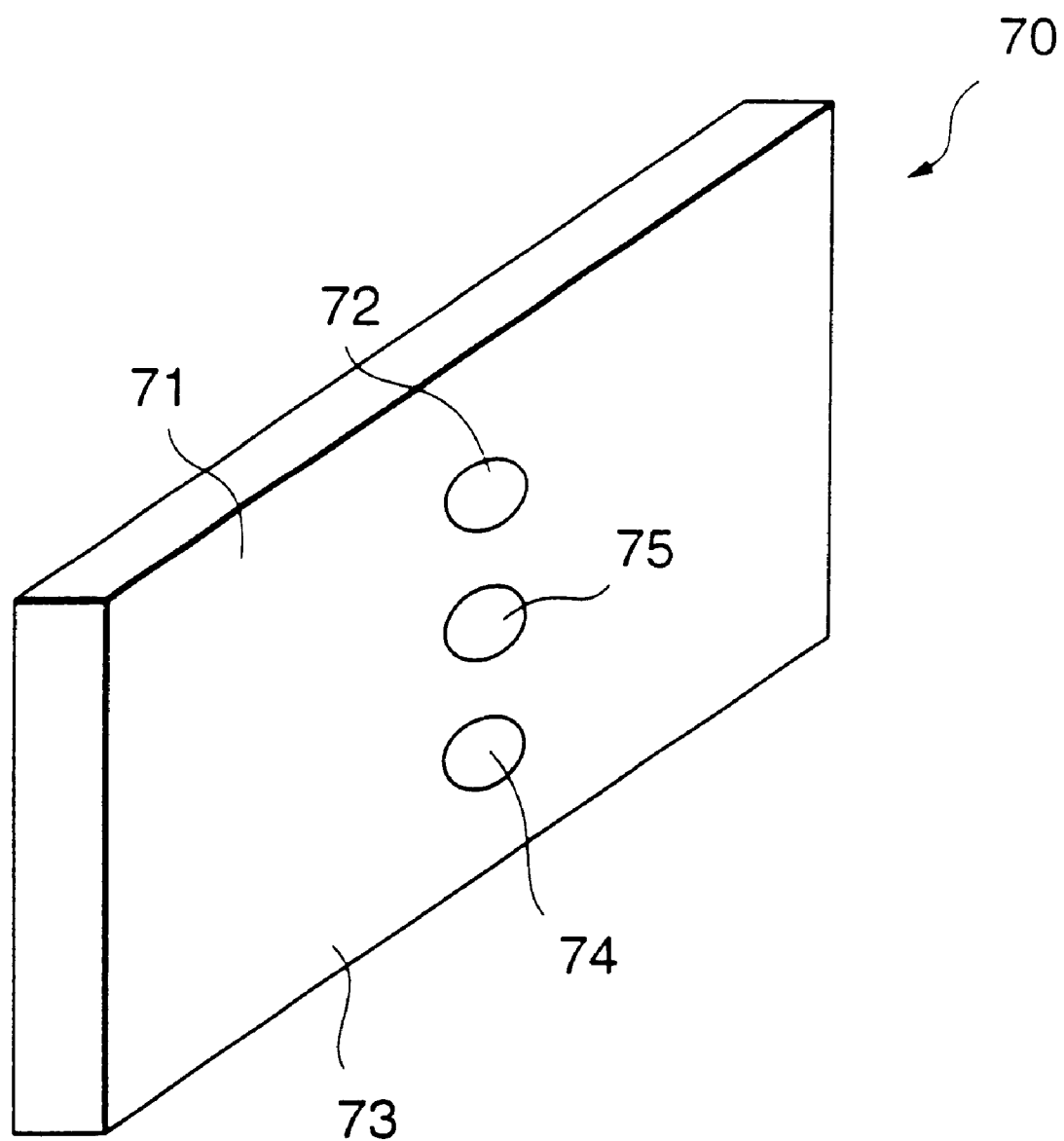
FIG. 2 is a diagram illustrating a sample used for the X-ray diffraction.

Referring to FIG. 2 illustrating a sample for measuring an X-ray diffraction image, the bottom portion of the bottle is cut into a width of 1 mm in the direction of thickness inclusive of the center 7 of the bottom portion, and the surface is polished to obtain a sample 70. A portion 72 on the inner surface side is set at a position separated away by 100 μm from the inner surface 71 of the sample, a portion 74 on the outer surface side is set at a position separated away by 100 μm from the outer surface 73, and a central portion 75 is set at a center between the portion 72 on the inner surface side and the portion 74 on the outer surface side.

Figure 3:
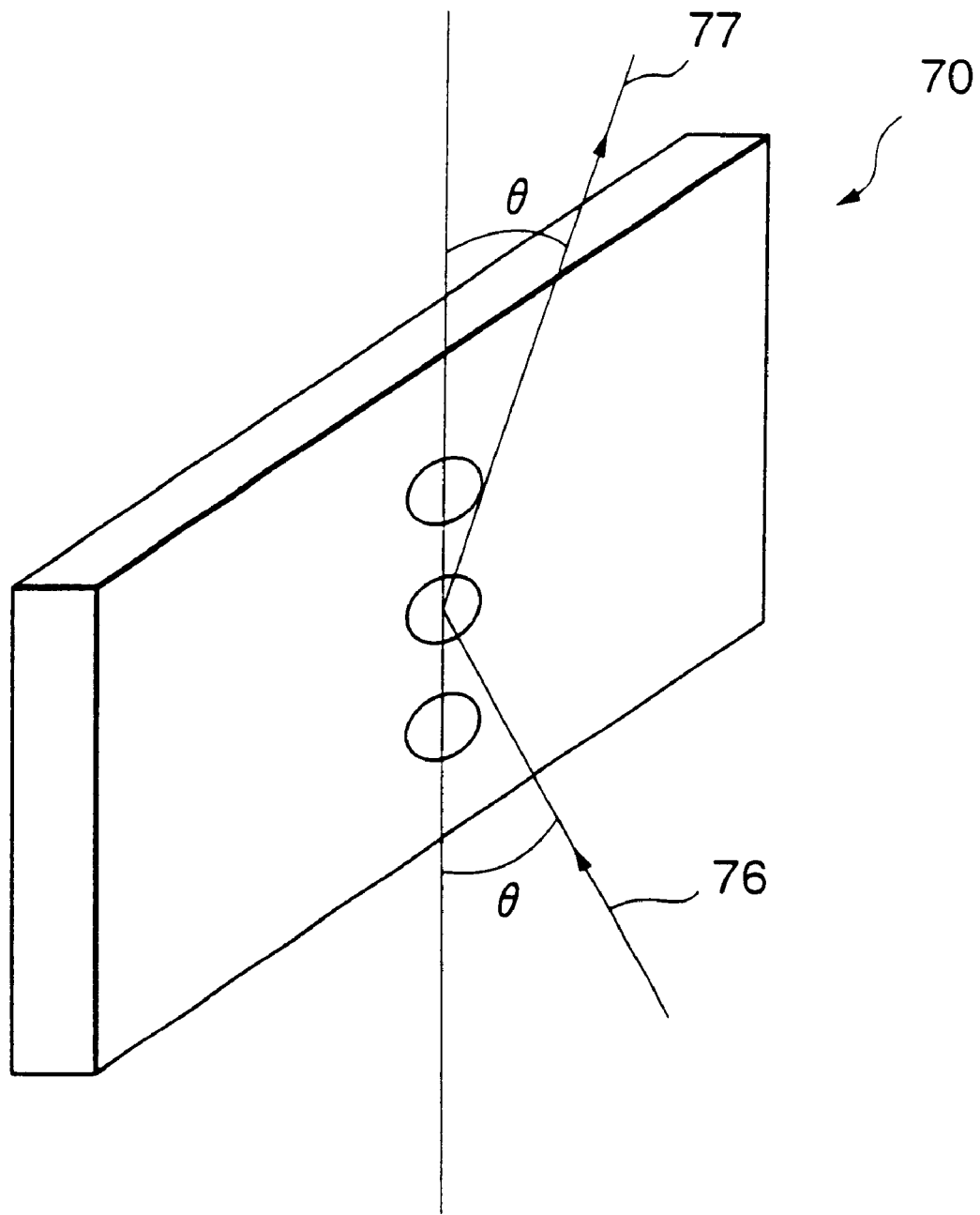
FIG. 3 is a diagram illustrating a method of X-ray diffraction.

Referring to FIG. 3 illustrating how to measure the X-ray diffraction image, the X-ray 76 is allowed to fall on the portion 72 on the inner surface side (or portion 74 on the outer surface side) of the sample 70 at a Bragg angle θ with respect to the direction of thickness, and the X-ray 77 scattered at the Bragg angle θ is detected by a counter (not shown). The dot diameter of the X-ray that is falling is 100 μm, and the details of the measuring conditions are as described in detail in Examples appearing later.

Figure 4:
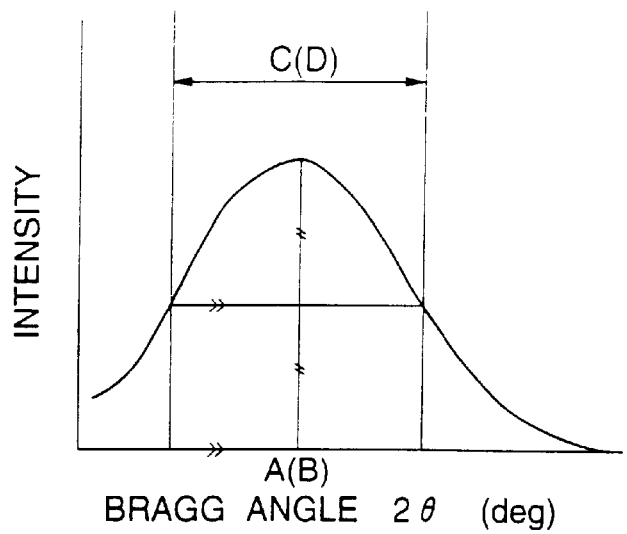
FIG. 4 is a diagram illustrating how to find a peak position and a half-value width in the X-ray diffuse scattering.

FIG. 4 is a diagram illustrating how to find a peak position A° (or B°) and a half-value width C° (or D°) from the image of diffracted intensity distribution of X-ray diffuse scattering. That is, when a line is drawn in parallel with the abscissa passing through points of one-half the intensity at the peak position A°, the half-value width C° is a distance between the two points at where the parallel line intersects the peak.

Figure 5:
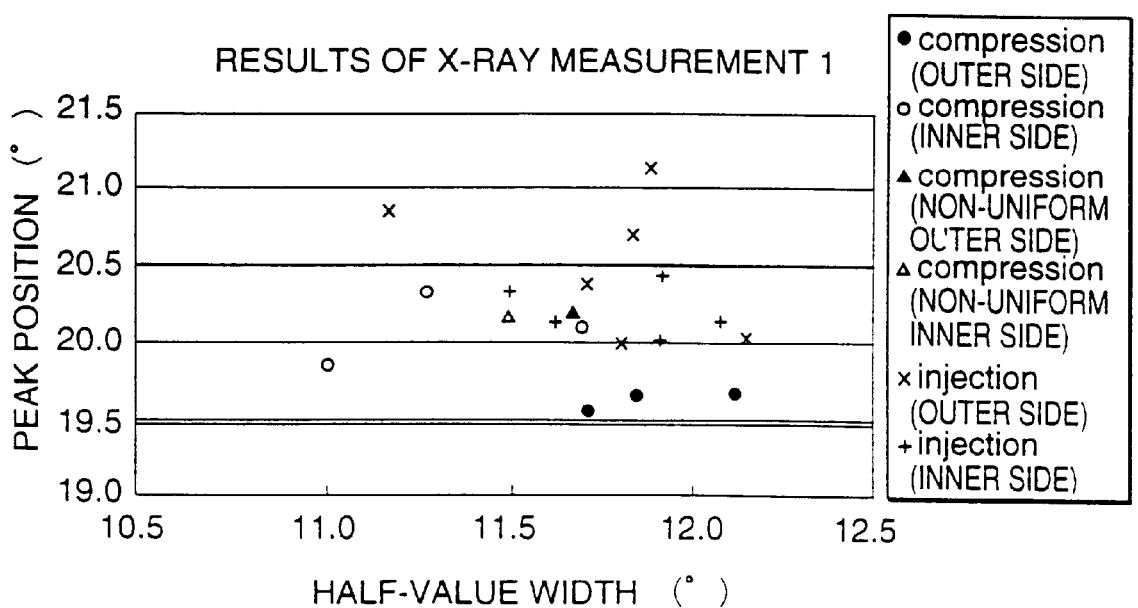
FIG. 5 is a graph illustrating a relationship between the peak positions and the half-value widths in the bottom portions of various bottles.

FIG. 5 illustrates a relationship between the peak positions in the X-ray diffuse scattering and the half-value widths of the peaks concerning the centers in the bottom portions of various polyester bottles.

Figure 6:
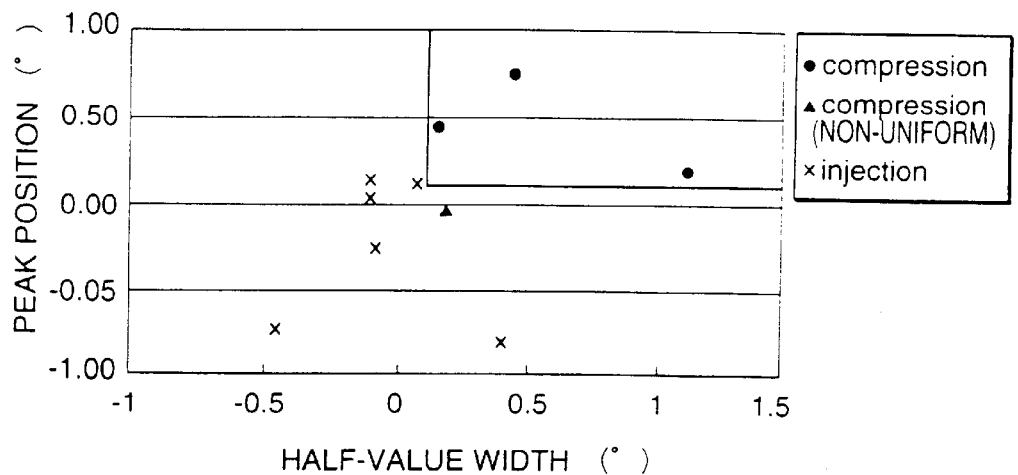
FIG. 6 is a graph illustrating a relationship between the difference (B–A) in the peak positions and the difference (C–D) in the half-value widths in the bottom portions of various bottles.

FIG. 6 illustrates a relationship between the difference (B–A) in the peak positions measured as described above and the difference (C–D) in the half-value widths concerning the polyester bottles.

The following facts will be obvious from the above results. In the following description, the subject portion is limited to the center in the bottom portion of the bottle and, hence, the positions are simply specified as a portion on the outer surface side and a portion on the inner surface side.

I. In some bottles formed from preforms obtained by the injection molding, a peak position A at a portion on the outer surface side may exceed 20.50°. In the bottle of the present invention, the peak position B at the portion on the inner surface side as well as the peak position A on the outer surface side are included in a range of from 19.45 to 20.50°.

II. In the bottle of the present invention, the peak position A at the portion on the outer surface side has an angle lower than that of the peak position B at the portion on the inner surface side at the center of the bottom portion, and the difference (B–A) therebetween is not smaller than 0.15 degrees. However, these requirements are satisfied by neither many bottles obtained from the known injection-molded preforms nor by the bottles from the compression-molded preforms having deviated thicknesses.

III. In the bottle of the present invention, further, the half-value width (C) of the X-ray diffuse scattering peak is larger than the half-value width (D) of the X-ray diffuse scattering peak at the portion on the inner surface side, and the difference (C–D) therebetween is not smaller than 0.10 degrees in addition to the above-mentioned requirement. However, the above-mentioned requirements II and III are not simultaneously satisfied by the bottles lying outside the scope of the present invention.

In general, the strain due to orientation by fluidization is large in the portion on the outer surface side where there is no hindrance in the fluidizing direction and is small in the portion on the inner surface side where there is a hindrance in the fluidizing direction. At the center in the bottom portion of the bottle having such strain due to orientation by fluidization, it is believed that the X-ray diffuse scattering peak appears on the side close to 2 θ=21° in the portion on the outer surface side, and appears on the side of a low angle in the portion on the inner surface side. It is further believed that the half-value width of the X-ray diffuse scattering peak is narrow in the portion on the outer surface side compared to the one in the portion on the inner surface side.

In the bottle of the present invention, on the other hand, the peak position (A) in the portion on the outer surface side has an angle lower than that at the peak position (B) in the portion on the inner surface side, the difference (B–A) thereof is not smaller than 0.15 degrees, the half-value width (C) of peak in the portion on the outer surface side is larger than the half-value width (D) of peak in the portion on the inner surface side, and the difference (C–D) thereof is not smaller than 0.10 degrees, manifesting that the strain due to orientation by fluidization does not substantially exist at the center in the bottom portion.

The bottle according to the present invention has little strain due to orientation by fluidization in the bottom portion, the bottom portion being uniformly and homogeneously stretched, having improved shock resistance and buckling strength, having excellent resistance against environmental cracking at the center of the bottom portion, without developing crazing or whitening during the preservation, and exhibiting excellent appearance.

Resin

In the present invention, any plastic material can be used provided it is capable of being stretch-blow-molded and thermally crystallized, such as thermoplastic polyester and, particularly, ethylene terephthalate thermoplastic polyester. It is, of course, allowable to use other polyesters such as polybutylene terephthalate, polyethylene naphthalate, or a blend thereof with a polycarbonate or an allylate resin; acryl-butadiene-styrene copolymer (ABS resin); polyacetal resin; nylons such as nylon 6, nylon 66, a copolymerized nylon thereof; acrylic resins such as poly(methyl methacrylate); polypropylene; polystyrene; as well as low-, middle- or high-density polyethylene, ethylene/propylene copolymer, ethylene/butene-1 copolymer, stylene/butadiene thermoplastic elastomer, cyclic olefin copolymer. To these plastics, various additives such as coloring agent, ultra-violet ray absorbing agent, releasing agent, lubricant and nucleating agent can be added, provided that the quality of the product is not affected.

In the ethylene terephthalate thermoplastic polyester used in the present invention, most of the ester recurring units and, generally, not less than 70 mol % and, particularly, not less than 80 mol % thereof are occupied by an ethylene terephthalate unit. It is desired to use a thermoplastic polyester having a glass transition point (Tg) of from 50 to 90° C. and, particularly, from 55 to 80° C. and having a melting point (Tm) of from 200 to 275° C. and, particularly, from 220 to 270° C.

It is desired to use a homopolyethylene terephthalate from the standpoint of resistance against the heat and pressure. It is, however, also allowable to use a copolymerized polyester containing small amounts of an ester unit other than the ethylene terephthalate unit.

As the dibasic acid other than the terephthalic acid, there can be exemplified aromatic dicarboxylic acids such as isophthalic acid, phthalic acid, and naphthalenedicarboxylic acid; alicyclic dicarboxylic acids such as cyclohexanedicarboxylic acid and the like acid; and aliphatic dicarboxylic acids such as succinic acid, adipic acid, sebacic acid and dodecanedionic acid, which may be used in one kind or in a combination of two or more kinds. As the diol component other than the ethylene glycol, there can be used propylene glycol, 1,4-butane diol, diethylene glycol, 1,6-hexylene glycol, cyclohexane dimethanol or ethylene oxide adduct of bisphenol A, which may be used in one kind or in two or more kinds.

It is also allowable to use a composite material obtained by blending the ethylene terephthalate thermoplastic polyester with a polyethylene naphthalate, a polycarbonate or a polyarylate having a relatively high glass transition point in an amount of from about 5% to about 25% in order to enhance the strength of the material under relatively high temperature conditions.

It is further allowable to use the polyethylene terephthalate and the above-mentioned material having a relatively high glass transition point which are laminated one upon the other.

The ethylene terephthalate thermoplastic polyester should at least have a molecular weight large enough for forming a film. Depending upon the applications, there is used the one of the injection grade or of the extrusion grade. It is desired that its inherent viscosity (I.V.) is generally from 0.6 to 1.4 dL/g and, particularly, from 0.63 to 1.3 dL/g.

Preform and its production

In the present invention, it is desired to use a preform obtained by subjecting the thermoplastic resin to the compression molding and, particularly, to the one-stage compression molding.

It was mentioned already that the strain due to orientation by fluidization does not substantially exist in the bottom portion of the preform obtained by the compression molding method, and there is obtained a bottle having excellent properties. In addition to this, however, there can be obtained many advantages as will be described below.

In the compression molding, unlike the injection molding, the processing can be effected at a relatively low temperature and, particularly, a pre-molded article for blow-molding is obtained by the heat-melting and the compression molding of one time, causing the resin to be less thermally deteriorated and making it possible to obtain a blown bottle having excellent properties.

That is, a cheap resin can be used for producing the blow-molded article having the same properties (strength, shock resistance) and when the same starting resin is used, there can be obtained the blow-molded bottle having superior properties. The bottle can be easily molded through the preform even when use is made of a starting resin having a high viscosity which is not suited for being injection-molded. In particular, it is allowed to obtain a large blow bottle that requires a large shock resistance.

In the one-stage compression molding method, it is desired that the amount of heat possessed by the mass of the molten resin is effectively utilized at the time of melt-extruding the resin, that the mass is prevented from being locally cooled as much as possible and, particularly, a portion of the mass of melt forming the bottom portion of the preform is not cooled, and that the movement of the resin on the surfaces of the metal mold is not limited during the compression molding, from the standpoint of producing a preform having homogeneous internal texture and excellent draw-blow moldability.

That is, in order that the orientation characteristics due to X-rays at the center in the bottom portion of the final bottle satisfy the above-mentioned requirements, the difference between the maximum thickness and the minimum thickness (tmax−tmin) of the barrel portion of the preform in the circumferential direction may be set to be not larger than 0.07 mm by taking the above-mentioned conditions into consideration.

For this purpose, the mass of melt of nearly a predetermined amount formed by cutting the extruded product is supplied into the female mold (cavity mold) without substantially permitting the temperature to drop, and the mass of melt that is supplied is readily compression-molded by using the metal mold (core mold).

Further, the preform having a bottom portion, a barrel portion and a mouth portion is compression-molded while quickly discharging the air remaining in the metal mold.

In the one-stage compression molding method, a drop in the temperature of the resin from when it is cut into a mass of melt until when it is thrown into the metal mold, seriously affects the homogeneity of the texture in the barrel portion with bottom of the preform that is to be stretch-blow-molded, draw orientation property and properties of the finally blow-molded articles and, particularly, shock resistance. The effect of a drop in the temperature appears conspicuously in the lower portion of the molten mass that forms the bottom portion of the preform (bottom portion of the finally blow-molded article).

That is, when the lower portion of the molten resin mass is locally cooled, the degree of strain increases in the bottom portion of the preform causing the finally blow-molded article to exhibit poor appearance and a decreased shock resistance.

In the one-stage compression molding method, a drop in the temperature of the mass of molten resin is substantially suppressed from when the molten resin is cut into a mass of melt until when it is thrown into the metal mold and, particularly, a drop in the temperature of the lower portion of the mass of molten resin is suppressed within the above-mentioned period of time, in order to effectively solve the above-mentioned troubles.

In order to suppress the drop in the temperature of the mass of melt as described above, the mass of melt should be avoided from contacting to other members except the holding portion after the melt is cut into the mass of melt until when it is thrown into the metal mold. In particular, contact should be avoided as much as possible between the lower portion of the mass of melt and other members.

For this purpose according to a preferred method of production, the molten polyester is cut in parallel with the axial direction of the male mold (core) and the female mold (cavity), and the mass of melt that is cut is supplied into the metal mold substantially maintaining a horizontal state.

In order to supply the mass of melt in nearly a predetermined amount and to avoid the lower portion thereof from being cooled as much as possible, further, it is desired that the mass of molten resin is fed in shape form of a cylinder or in a shape close to the cylinder.

Moreover, in order to avoid the drop in the temperature in the lower portion of the mass of melt as much as possible and to stably supply the mass of melt, i.e., to prevent the mass of melt from falling, it is desired that the mass of melt is held at a position higher than the center of gravity thereof, and is moved from the cut position to the position of the metal mold and is supplied into the metal mold.

In order to avoid the mass of melt from being cooled, it is desired that the mass of melt is thrown into the metal mold within a period of time as short as possible after it is cut into the mass and that the molding is started within a period of time as short as possible after it is thrown into the metal mold. Generally, it is recommended that the mass of melt is thrown into the metal mold within one second after it is cut, and is molded within 0.5 seconds after it is thrown into the metal mold.

In the one-stage compression molding, it is quite important that the compression molding is effected while expelling the air remaining in the bottom of the metal mold or remaining in the vicinities thereof. That is, under the condition where the air remains in the metal mold, wrinkles tend to develop in the portions adhered to the metal mold or in the vicinities thereof. When the air is quickly expelled after the start of the molding, on the other hand, development of wrinkles is effectively prevented. Occurrence of the wrinkles is attributed to that the portions intimately adhered to the surface of the metal mold and the portions not intimately adhered to the surface of the metal mold are arranged maintaining fine gaps, which is believed to be a phenomenon specific to the compression molding. Under the conditions where the air is expelled, it is considered that the resin is intimately adhered again to the surface of the metal mold to form the container wall without wrinkles.

To expel the air remaining on the surface of the female metal mold, escape passages for the residual air may be formed from the molding portion to the external side, and no particular limitation is imposed on this means. For instance, the female metal mold may be provided with fine gaps or a porous portion in the bottom portion thereof or in the vicinities thereof. Further, it is particularly effective if the residual air is forcibly expelled by using an external vacuum pump simultaneously with the start of the molding.

In the one-stage compression molding method, the female metal mold and the male metal mold may have such shapes and structures as to mold the barrel portion with bottom and the mouth portion. Though there is no particular limitation, it is generally desired that the male metal mold comprises a core metal mold and a follower metal mold that surrounds the core metal mold and is allowed to be opened and closed in concentric therewith, that the tapered portion with bottom is molded by the core metal mold and the female metal mold (cavity mold), and that the mouth portion is molded by the core metal mold and the follower metal mold.

In this case, the follower metal mold is reciprocally moved together with the core metal mold. The follower metal mold is always urged toward the female metal mold due to the urging means such as spring. At the bottom dead center of the core metal mold, the core metal mold and the follower metal mold are maintained in a state of being contacted to each other at all times.

Despite there is a small change in the amount of the mass of molten resin, therefore, there is always formed a preform having the mouth portion of a predetermined shape maintaining a predetermined height (from the inner surface of the bottom portion to the top surface of the mouth portion) at all times, the mouth portion being important for accomplishing the sealing. A change in the amount of the mass of molten resin can be absorbed relying on the mesh of the core metal mold and the female metal mold (cavity metal mold), i.e., relying on the thickness of the barrel portion with bottom of the preform that is formed.

In general, the outer periphery of the mouth portion of the bottle is provided with a support ring for supporting the bottle at the time of filling the bottle with the content, and the structure of the mouth portion is formed in the stage of forming the preform. According to the present invention, however, an annular groove is formed in the inner peripheral edge portion in the lower surface of the support ring. Owing to this annular groove, a change in the mass of molten resin is absorbed as a change in the height of the annular groove, whereby the thickness of the preform is prevented from changing and the wall of the preform acquires a homogeneous texture. The annular groove also remains in the bottle formed from the preform and works to suppress a change in the thickness of the bottle as a matter of course.

The mass of the molten resin can be supplied nearly quantitatively by melt-extruding the resin through an extruder and, further, through a gear pump and cutting the resin at a predetermined timing. Still, however, the amount of supplying the resin inevitably varies within a certain range. According to the above-mentioned molding system, this variation can be easily absorbed.

In the one-stage compression-molding method, some degree of pressure may be necessary for preventing the loss at the time of molding but the molding force may generally be considerably small offering an advantage. Compared to the injection-molding apparatus, therefore, the compression-molding apparatus is constructed in a considerably small size to decrease the cost of the apparatus.

The preform for blow-molding used in the present invention is formed by compression molding a molten resin such as polyester or polypropylene, and has the mouth portion of a shape and a size corresponding to the mouth portion of the finally molded article, and has a barrel portion with bottom that is to be blow-molded, as well as a feature in that the strain due to orientation by fluidization does not substantially exist in the closed bottom portion and no gate portion is included, either.

The gate portion present in the preform with bottom obtained by the injection molding causes a great deal of problem with respect to productivity, cost of production and properties of the finally blow-molded article. However, the preform used in the present invention has no gate portion and, hence, requires no step of cutting and does not produce scrap resin. Besides, the central portion on the bottom is smooth causing neither crystallization or whitening.

In the preform for blow-molding used in the present invention, further, no wrinkle develops in the bottom portion or in the vicinities thereof since the molding is carried out under the above-mentioned strict temperature control and under the conditions of expelling the residual air.

The above-mentioned preform for blow-molding has no strain due to orientation by fluidization, no gate and no wrinkle in the bottom portion, and features very excellent smoothness and homogeneity in the texture. Therefore, the blow-molded article obtained by stretch-blow-molding the preform has very excellent appearance and shock resistance in the bottom portion.

Further, the preform makes it possible to produce a blow-molded article which permits the resin to be thermally deteriorated little as described earlier and features excellent properties such as tensile strength, resistance against the pressure, shock resistance and heat resistance.

Compression-Molding Apparatus

Figure 7:
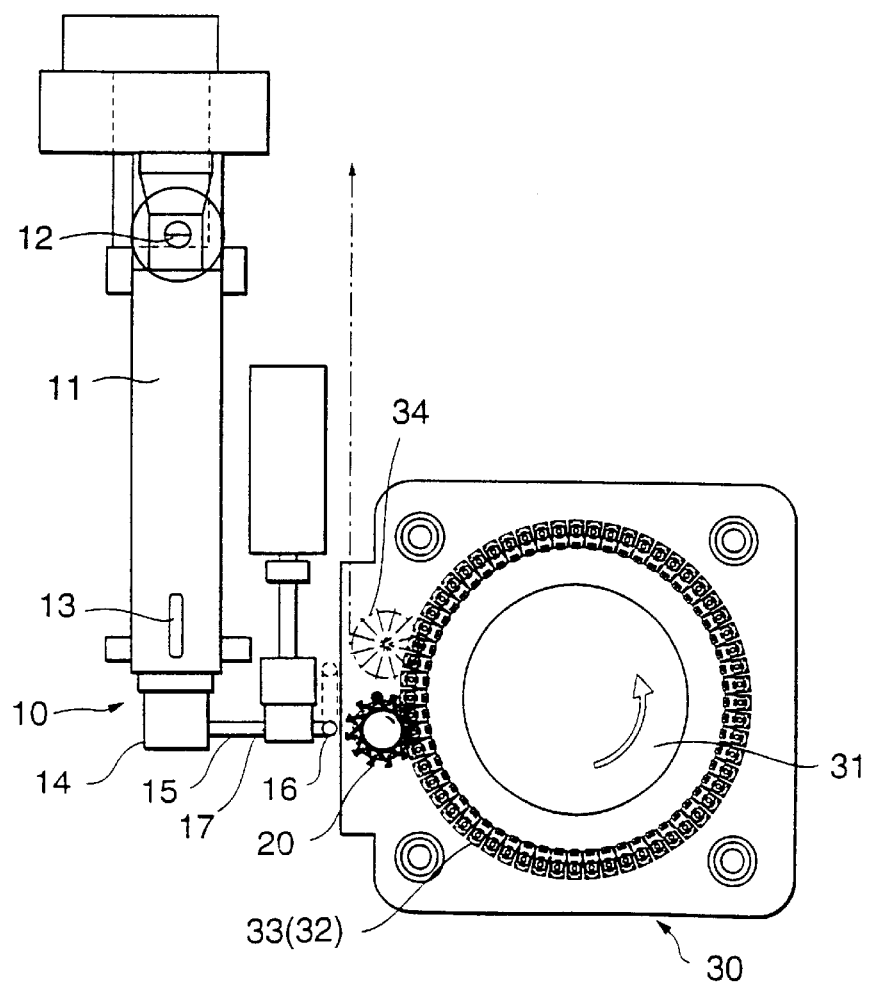
FIG. 7 is a plan view illustrating the whole arrangement of an apparatus used for a one-stage compression-molding method.
Figure 8:
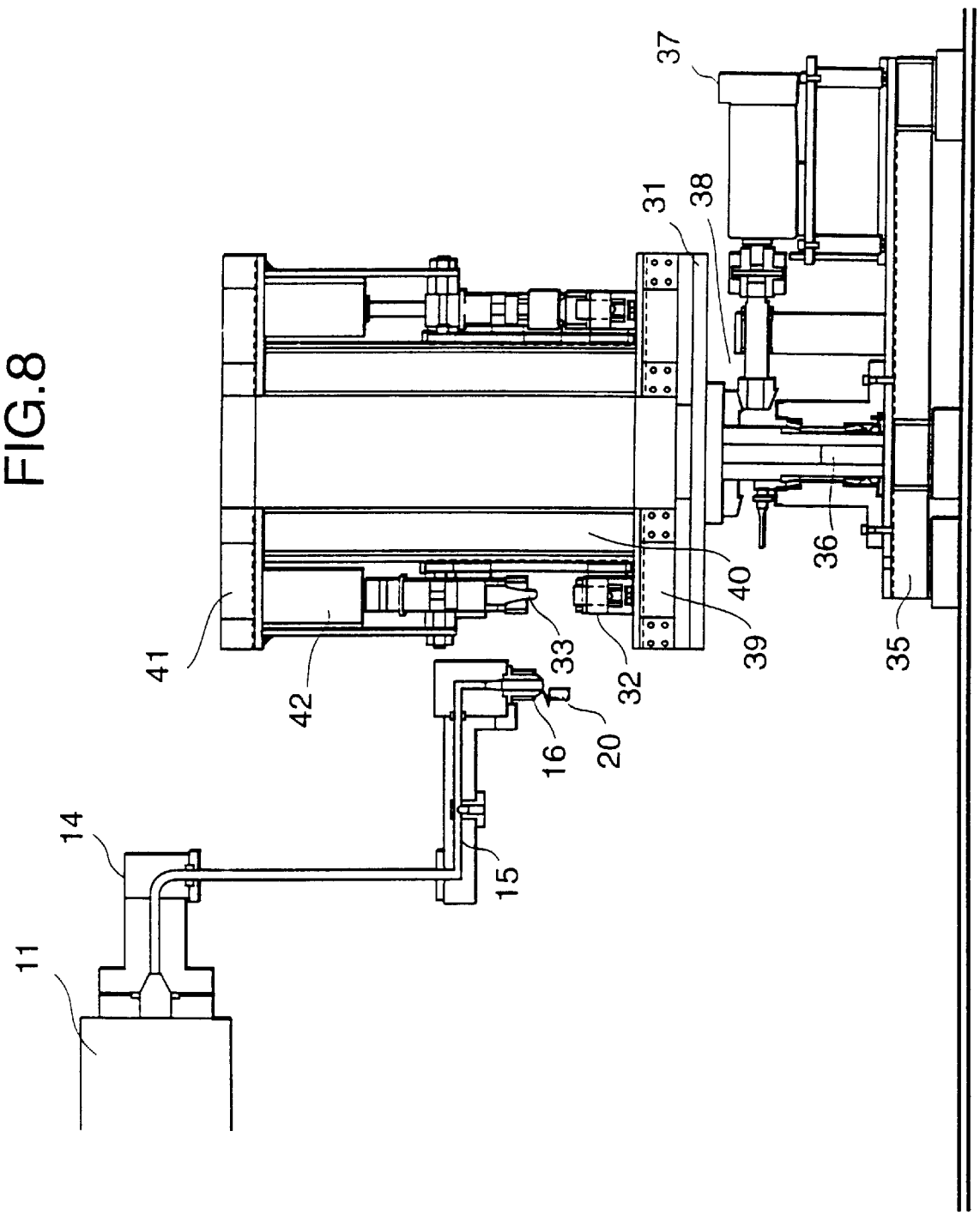
FIG. 8 is a side view of the apparatus of FIG. 7.

Referring to FIG. 7 (plane view) and FIG. 8 (side view) illustrating the whole arrangement of the apparatus used in the one-stage compression-molding method, the apparatus roughly comprises a resin extruder device 10, a device 20 for cutting and feeding a mass of melt, and a compression-molding device 30 for forming a preform.

The extruder device 10 is provided with an extruder main body 11 for melting and kneading the resin. A vacuum hopper 12 is provided on the inlet side of the main body to hold, in dry state, the powder or pellets of the thermoplastic resin that is to be molded and to feed it to the extruder main body. On the outlet side of the main body, there are provided a suction vent 13 for sucking and removing decomposed gases in the resin, and a die head 14 for receiving the extruded molten resin.

The die head 14 is connected to an extruder nozzle 16 through a conduit 15. Here, it is desired to provide a gear pump 17 between the die head 14 and the extruder nozzle 16 to supply the molten resin in a predetermined amount. FIG. 8 does not show the gear pump 17 to avoid the drawing from becoming complex.

Figure 9:
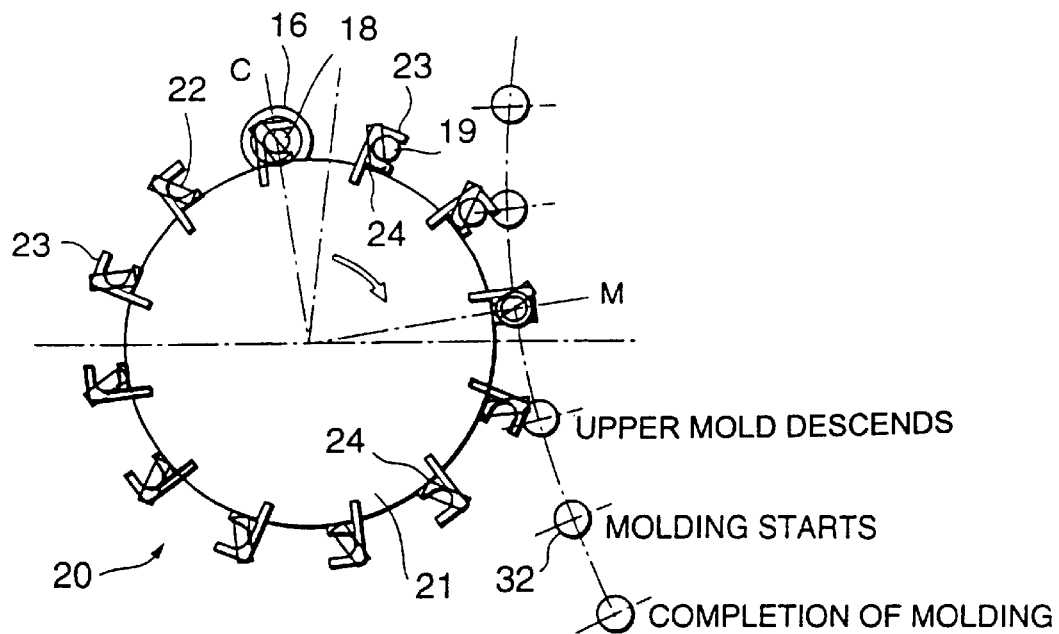
FIG. 9 is a plane view of an apparatus for cutting and feeding masses of melt.
Figure 10:
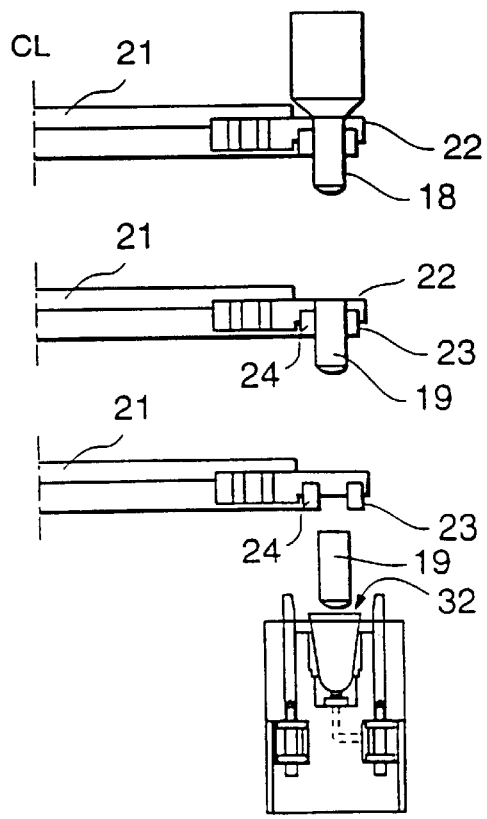
FIG. 10 is a side view illustrating the steps in the apparatus of FIG. 9.

Referring to FIGS. 9 and 10, the device 20 for cutting and feeding the mass of melt comprises a cutter 22 provided on a rotary turret 21, and a combination of an outer grip member 23 for gripping the mass of melt and an inner grip member 24. The cutter is tilted with respect to the radial direction of the turret 21 and cuts the melt 18 of the resin extruded from an extruder nozzle 16 in a direction at right angles with the direction of extrusion.

The outer grip member 23 comprises a portion extending in the radial direction of the turret and an outer portion extending in the circumferential direction, and is secured to the turret 21. On the other hand, the inner grip member 24 is allowed to move in the radial direction of the turret relative to the outer grip member 23.

The rotary turret 21 of the cutting/feeding device 20 is so provided as to pass under the extruder nozzle 16 of the extruder device 10 and over a female metal mold 32 of the lower compression-molding device 30. Under the extruder nozzle 16, the melt 18 is gripped by the grip members 23 and 24, and is cut by the cutter 22. The mass 19 of melt is moved over the female metal mold being gripped by the grip members 23 and 24, and the mass 19 of melt is released from the grip members 23 and 24, and is thrown into the female metal mold 32.

From FIGS. 7 to 10, it will be obvious that in the one-stage compression-molding apparatus, the melt 18 of the thermoplastic resin is extruded in parallel with the axial direction of the male metal mold 33 and the female metal mold 32, and the mass 19 of melt that is cut is fed into the female metal mold 32 in a state of being maintained substantially in parallel, that the mass 19 of melt is supplied in nearly a predetermined amount due to the gear pump 17 and in a cylindrical shape or in a shape close to the cylinder, and that the mass 19 of melt is gripped at a portion higher than the center of gravity thereof by the grip members 23 and 24, and is moved from the cutting position C to the position M of the metal mold so as to be fed into the metal mold 32.

Roughly speaking, the compression-molding apparatus 30 comprises a rotary turret 31, and combinations of many female metal molds (cavity metal molds) 32 and male metal molds (core metal molds) 33 arranged surrounding the rotary turret.

The rotary turret 31 is provided with the above-mentioned mechanism 20 for cutting and feeding the mass of melt, and a mechanism 34 for taking out the preform for blow-molding that is molded.

The rotary turret 31 is supported by a machine frame 35 through a vertical shaft 36 in a horizontal direction so as to rotate, and is rotated by a motor 37 and a drive transmission mechanism 38.

Combinations (sets) of the female metal molds 32 and the male metal molds 33 are secured in many number on the upper peripheral surface of the rotary turret 31. That is, the female metal mold 32 is secured on the rack 39, whereas the male metal mold 33 is provided so as to move up and down in concentric with the female metal mold 32 owing to a lift drive mechanism 42 such as hydraulic mechanism through a vertical support member 40 and a horizontal support member 41.

Figure 11:
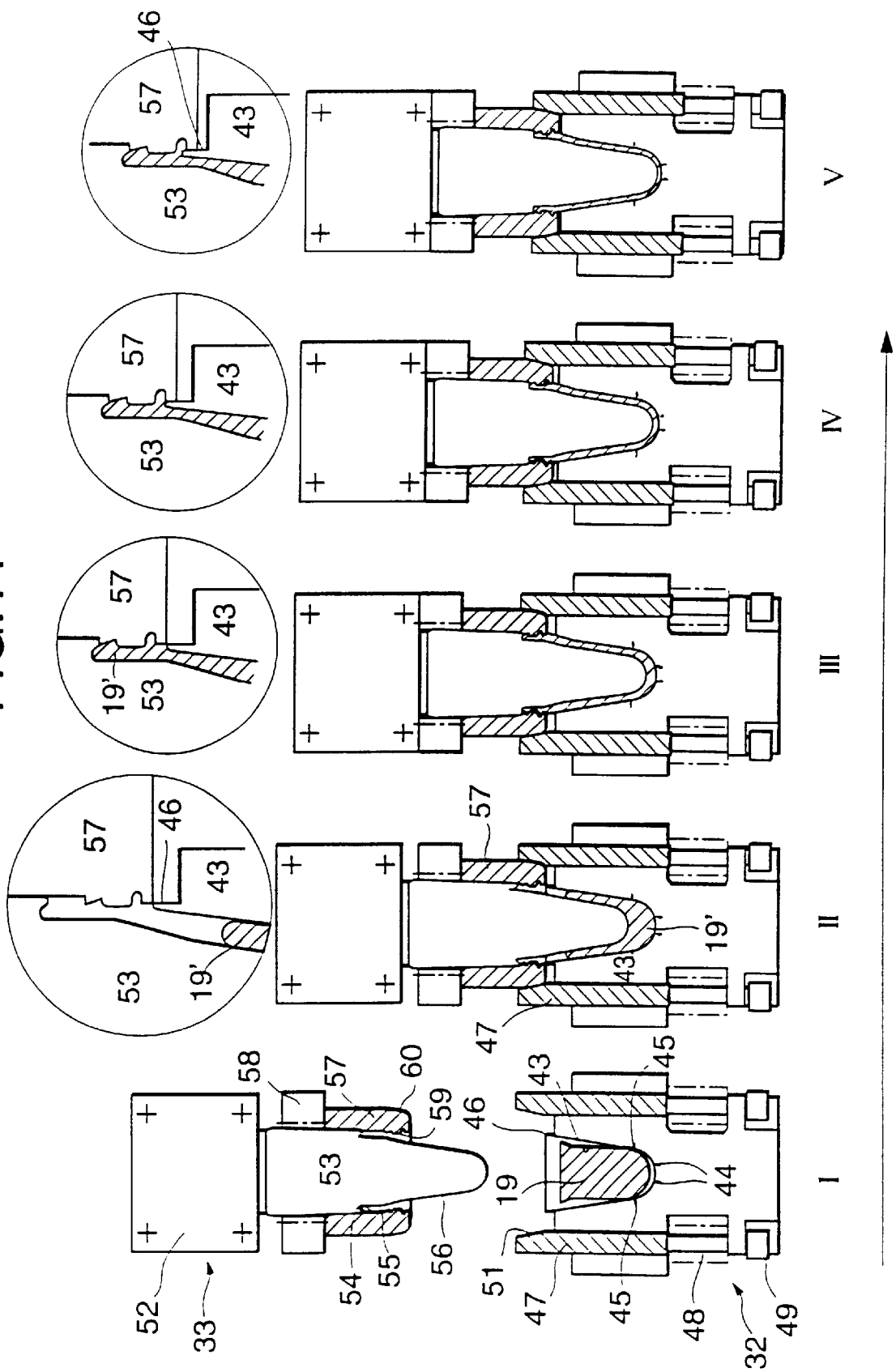
FIG. 11 is a side sectional view illustrating the stages in the step of compression molding.
Figure 12:
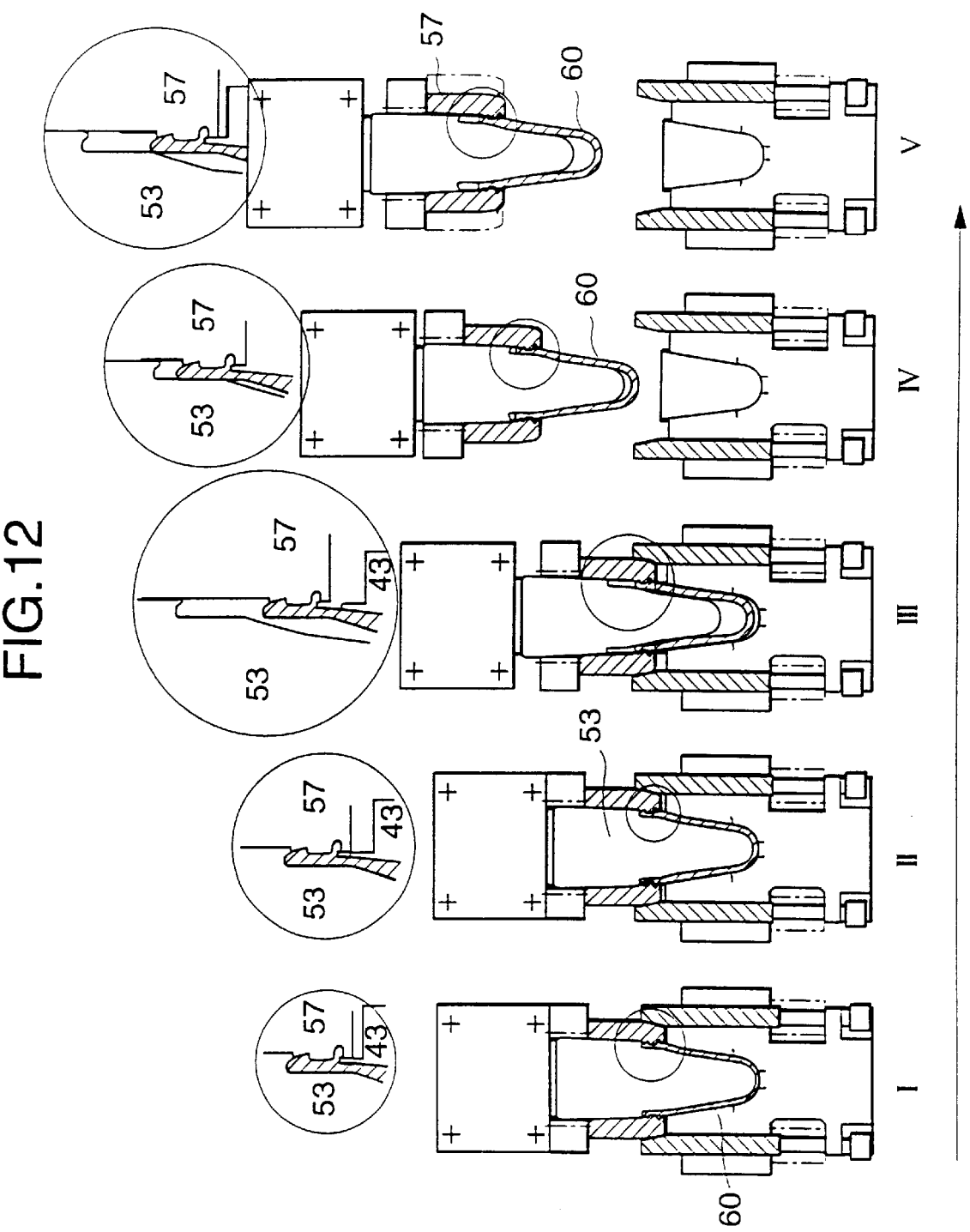
FIG. 12 is a side sectional view illustrating the stages in the step of taking out the preform after the compression molding.

In FIGS. 11 and 12 which illustrates the structures of the female metal mold 32 and the male metal mold 33 in detail and the steps of molding, the female metal mold 32 has a cavity 43, vent portions 44 in the bottom portion thereof for expelling the residual air, and vent portions 45 in a portion connecting the bottom portion to the tapered portion.

Upwardly directed small protuberances 46 are formed surrounding the upper portion of the cavity 43. The operation will be described later.

Further, a slidable ring-like follower member 47 is provided around the female metal mold 32 in concentric therewith. The follower member 47 has a shaft 48 extending downward, and has a stopper 49 formed at the lower end thereof, the stopper 49 being fitted in a recess 50 in the lower portion of the female metal mold 32. It will thus be obvious that the stopper 49 is allowed to move up and down between the upper surface and the lower surface of the recess 50. The stopper 49 is urged upward by a means such as a spring (not shown) or the like. Further, a tapered portion 51 for engagement having a diameter increasing upward, is formed in the inner peripheral surface in the upper part of the follower member 47.

The male metal mold 33 is equipped with a core metal mold 53 secured to a support member 52 that can be moved up and down. The core metal mold 53 includes a portion 54 for forming the top surface of the mouth portion of the preform, a portion 55 for forming the inner peripheral surface of the mouth portion, and a portion 56 for forming the inner surface of the tapered barrel portion with bottom.

The core metal mold 33 is surrounded by the follower metal mold 57 that is allowed to be opened and closed in concentric therewith. The follower metal mold 57 is secured to a follower support member 58. Though not diagramed, a push spring is provided between the support member 52 and the follower support member 58 to urge the follower metal mold downward.

On the lower inner peripheral surface of the follower metal mold 57 is formed a portion 59 for forming the inner peripheral surface of the mouth portion of the preform. On the other hand, on the lower outer peripheral surface thereof is formed a tapered portion 60 for engagement having a diameter decreasing downward.

In the compression-molding apparatus shown in FIGS. 11 and 12, the pushing forces (absolute values) of the members are set as described below to smoothly conduct the operations.

Pushing force of the male mold 33>pushing force of the follower member 47>pushing force of the follower metal mold 57

The above-mentioned apparatus performs the molding operation as described below.

(A) Step of Extruding the Melt:

The thermoplastic resin is fed into the vacuum hopper 12 of the extruder 10, melted and kneaded by the barrel and screw in the extruder main body 11 in vacuum state without moisture of the external air, fed to the nozzle 16 through the die head 14 and the conduit 15 in a predetermined amount due to the gear pump 17, and is extruded into a cylindrical shape through the nozzle 16.

(B) Step of Cutting and Feeding:

The resin flow 18 melt-extruded from the nozzle 16 is cut by a cutter 22 into a mass 19 of melt of a cylindrical shape or of a shape close to the cylinder. The mass 19 of melt is gripped by the grip members 23 and 24, is moved from the cutting position C to the position M for feeding into the female metal mold 32 accompanying the turn of the turret without substantially permitting the temperature to drop, and is thrown into the female metal mold 32.

(C) Step of Compression Molding:

In a step of approach designated at I in FIG. 11, the cavity metal mold 43 and the core metal mold 53 are still opening, and the mass 19 of melt is accommodated in an erected state in the cavity 43. The core metal mold 53 starts descending.

In a step of fastening the cavity metal mold designated at II in FIG. 11, the core metal mold 53 descends into the cavity, and space defined by the cavity 43 and the core 53 is nearly filled with the molten resin 19'. Simultaneously with the start of the compression molding, the air remaining in the cavity is quickly expelled to the external side through the vent portions 44 and 45.

At the same time, the follower metal mold 57 descends to come in contact with the follower member 47, but there still exists a gap between the upper surface of the follower support member 58 and the lower surface of the male metal mold support member 52.

In a step of fastening the core metal mold designated at III in FIG. 11, the core metal mold 53 further descends, and the upper surface of the follower support member 58 comes in contact with the lower surface of the male metal mold support member 52. Therefore, the molten resin 19' in the cavity flows into space defined by the core metal mold 53 and the follower metal mold 57.

In a step of solidification at a high temperature designated at IV in FIG. 11, the core metal mold 53 further descends to some extent, and the follower member 47 descends accompanying thereto, so that space defined by the cavity 43, core metal mold 53 and follower metal mold 57 is filled with the resin.

In a step of solidification at a low temperature designated at V in FIG. 11, the volume of the resin contracts, i.e., whiskers develop due to a drop in the resin temperature. However, the strain caused by the contraction of volume can be absorbed by applying a compressive force to the male metal mold (core 53).

In this case, it becomes necessary, as a matter of course, to so move the core metal mold 53 and the cavity metal mold 43 as to come in mesh together. Upon bringing the upwardly directed small protuberances 46 of the cavity metal mold 43 into mesh with the follower metal mold 57, however, it becomes possible to absorb the contraction of the volume and to obtain a preform for blow-molding without strain. A portion at which the upwardly directed small protuberances 46 are brought in mesh with the follower metal mold 57, forms the above-mentioned annular groove in the preform.

The steps for taking out the compression-molded preform are designated at I to IV in FIG. 12. In a step I, the molding is finished. In a step II, the core metal mold 53 starts rising; i.e., the metal mold starts opening. In a step III, the core metal mold 53 rises earlier than the follower metal mold 57 to remove the core from the preform 60 that is molded. In a step IV, the core metal mold 53 further rises and the preform 60 is taken out of the cavity 43. In a step V, at a position where the core metal mold rises again, the follower metal mold 57 moves to a position (indicated by a dotted line) on the outer side of its diameter to release the preform 60 for blow-molding that is held.

Molding Conditions

When the thermiplastic polyester is used, the temperature (die head temperature) for melt-extruding the thermoplastic polyester resin lies, preferably, in a range of Tm+100° C. to Tm+10° C. and, particularly, Tm+40° C. to Tm+20° C. with the melting point (Tm) of the thermoplastic polyester resin as a reference, though the thermoplastic resin used in the present invention may vary depending upon the kind of the resin.

When the temperature is lower than the above-mentioned range, the shearing speed becomes too great that it often becomes difficult to form a uniformly melt-extruded product. When the temperature is higher than the above-mentioned range, on the other hand, the resin is thermally deteriorated to a great extent or the draw-down becomes conspicuous.

The weight of the mass of the melt to be cut is determined by the finally blown bottle as a matter of course, but is, generally, selected from a range of 100 to 2 g and, particularly, 40 to 10 g to meet the required strength.

The mass of melt can be easily handled when it has a cylindrical shape or a shape close thereto. The mass of melt has a ratio (H/D) of the height (H) to the diameter (D) of, generally, from 0.8 to 4 from the standpoint of preventing a drop in the temperature of the mass of melt as much as possible and easily throwing the mass of melt into the female metal mold.

That is, when the ratio H/D lies outside the above-mentioned range, the surface area of the mass of melt increases and the temperature tends to drop.

Any cutter can be used for cutting the mass of molten resin and, preferably, the one capable of preventing the sticking of resin. The surface treatment such as shot-blasting the surfaces of the tool is particularly effective.

As the grip members for moving the mass of molten resin, there are used those made of a material having good heat-insulating property and having areas contacting to the resin as small as possible.

It is desired that the mass of the molten resin is thrown into the metal mold quickly and within a period of time described already after it is cut.

As the compression-molding metal mold, there is used the one having fine gaps or a porous portion in the bottom portion or in the vicinities thereof, the fine gaps being formed by dividing the bottom portion or the vicinities thereof into several pieces or by forming holes in the metal mold for expelling the air. The porous portion is formed by machining, for example, a sintered metal or the like.

The surface temperature of the compression-molding metal mold may be the one at which the molten resin is solidified and will, preferably, be from 65 to 30° C. in the case of a polyester. In order to maintain the surface temperature of the metal mold to lie within the above-mentioned range, it is desired that a medium such as cooling water or temperature-controlled water is passed through the metal mold.

One of the features is that a considerably small molding force is required for the compression molding. The molding force may differ to a considerable degree depending on the kind of the resin and the size of the preform for blow-molding. Generally, however, the molding force is from 800 to 50 kgf and, particularly, from 600 to 150 kgf.

Through the above-mentioned compression molding of one stage, there is obtained a preform for blow-molding without strain due to fluidized orientation in the bottom portion, without gate portion, and without requiring any trimming operation. Therefore, the preform can be used in its form in the step of draw-blow-molding offering many advantages such as simplifying the steps and enhancing the productivity.

Preform for Blow-Molding

Figure 13:
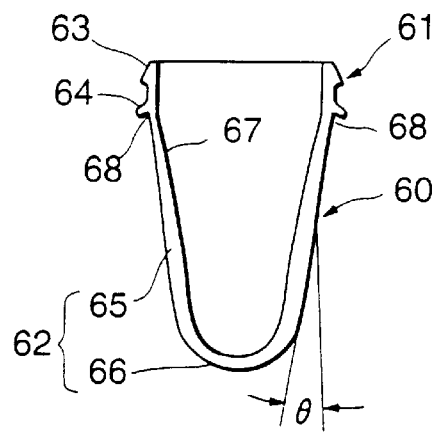
FIG. 13 is a sectional view illustrating a preform for blow molding used in the present invention.

Referring to FIG. 13 illustrating the preform for blow-molding of the present invention, the preform 60 roughly comprises a mouth portion 61 and a tapered barrel portion 62 with bottom. The mouth portion 61 becomes a mouth portion of the bottle which is a finally molded article. Around the outer periphery of the mouth portion 61 are formed an engaging portion 63 for the closure necessary for being sealed with the closure and a support ring 64. The barrel portion 62 with bottom is a portion that is to be drawn and blow-molded and includes a tapered side wall portion 65 and a bottom portion 66 smoothly continuous thereto and protruding downward. As described already, the bottom portion 66 is substantially free of strain caused by fluidized orientation, and has neither residual gate portion nor wrinkles. The mouth portion 61 and the barrel portion 62 with bottom are smoothly continuing through a connection portion 67.

It will be obvious that an annular groove 68 is formed in the inner peripheral edge on the lower surface of the support ring 64.

The tapered side wall portion 65 and the bottom portion 66 have sizes and shapes that must lie within predetermined preferred ranges from the standpoint of compression moldability and moldability at the time of draw-blowing that is finally effected. In general, it is desired that the side wall portion 65 has an outer surface of the shape of a circular truncated cone and the bottom portion 66 has an outer surface of the shape of a partial spherical surface smoothly continuing to the surface of the circular truncated cone, from the standpoint of moldability. However, they may have any shape to meet the shape of a blow-molded article.

The inner surface, too, of the side wall portion 65 is that of the circular truncated cone continuous through the inclined portion 67 of which the thickness increases from the inner periphery of the connection portion.

It is desired that the tapered angle (θ) on the outer surface of the side wall portion is from 0.5 to 89.5° from the standpoint of moldability.

Figure 14:
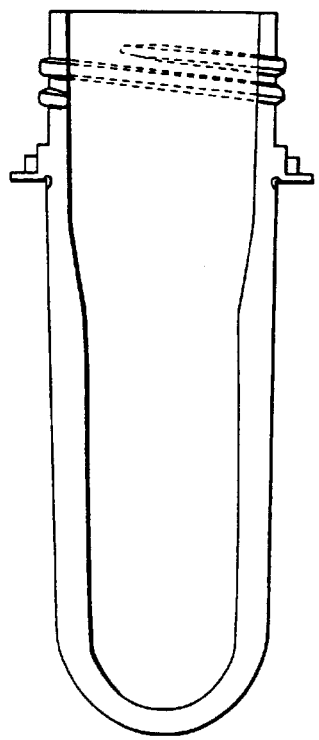
FIG. 14 is a sectional view illustrating another preform for blow molding used in the present invention.
Figure 15:
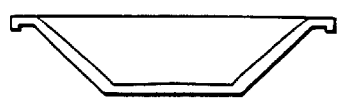
FIG. 15 is a sectional view illustrating a further preform for blow molding used in the present invention.

FIG. 14 is a sectional view of the preform for blow-molding of when the tapered angle is 0.8°, and FIG. 15 is a sectional view of the preform for blow-molding of when the tapered angle is 45°.

The side wall portion 65 and the bottom portion 66 may have uniform thicknesses except the inclined portion 67 or may have thicknesses that changes, e.g., the thickness of the side wall portion increasing toward the bottom portion.

The above-mentioned preform may be directly subjected to the stretch-blow-molding, or the mouth portion may be crystallized and whitened through the heat treatment in the stage of the preform in order to impart heat resistance and rigidity to the mouth portion of the preform. Or, after the preform is molded into a bottle by the biaxial stretch-blow-molding that will be described later, the mouth portion of the obtained plastic bottle may be crystallized and whitened.

Stretch-Blow-Molding

The preform is heated at a drawing temperature, and is pulled and drawn in the axial direction and is blow-drawn in the circumferential direction to obtain a bottle.

The molding and the stretch-blow-molding of the preform can be accomplished by the cold parison system as well as by the hot parison system according to which the stretch-blow-molding is effected without completely cooling the preform formed by the compression molding.

Prior to effecting the stretch-blow-molding, as required, the preform is pre-heated up to a temperature suited for the drawing by such means as the hot air, infrared-ray heater or high-frequency induction heating. In the case of the polyester, the temperature range is from 85 to 120° C. and, particularly, from 95 to 110° C.

The preform is fed into a stretch-blow-molding machine that has been known per se., set into the metal mold, pulled and drawn in the axial direction by inserting a drawing rod, and is blow-molded in the circumferential direction by blowing a fluid.

It is desired that the final bottle has a drawing ratio of from 1.5 to 25 times in terms of an area ratio, and that the drawing ratio in the axial direction is from 1.2 to 6 times and the drawing ratio in the circumferential direction is from 1.2 to 4.5 times.

The stretch-blow-molded bottle can be thermally set by a known means. The thermal setting can be effected in a blow-molding metal mold relying on a one-mold method or in a thermosetting metal mold separate from the blow-molding metal mold relying on a two-mold method. The thermosetting is effected preferably at a temperature of from 100 to 200° C.

EXAMPLES

The invention will be further described by way of following Examples.

Preparation of Containers

The containers were prepared in a manner as described below and were used for the following experiment.

(1) Compression-Molding of the Preforms.

A polyethylene terephthalate resin EFS-7H manufactured by Kanebo Gosen Co. was dried in a drier, vertically extruded through a nozzle having a diameter of 22 mm by using an extruder of a diameter of 65 mm and L/D of 27, and the resin in a molten state was horizontally cut by using a cutter rotating in a horizontal direction to obtain a mass of melt of a weight of 20 g, immediately conveyed, permitted to vertically fall into a female metal mold in the molding machine rotating in synchronism with the rotation of the cutter, compression-molded while closing the metal mold at a high speed and expelling the residual air in the metal mold, solidified by cooling for about 12 seconds while applying a force of about 700 kgf, and the metal mold was opened to obtain a preform for blow-molding having a mouth of a diameter of 38 mm, a height of 63 mm, an average thickness of 3 mm and a weight of 20 g.

(2) Injection-molding of the preforms.

The preforms were molded in the same manner as described above but effecting the molding using an injection-molding machine (FE-160, manufactured by Nissei Jushi Kogyo Co.) under the following conditions:

Temperature setting: C1/C2/C3/RS nozzle/nozzle/HR= 275/285/285/285/290/290

Cycle time: 25.9 seconds (3) Stretch-Blow-Molding of the Bottles.

The preform was heated in a draw-blow machine at 110° C., drawn in the vertical direction in the blow metal mold and was, then, blow-molded with a high-pressure air of 35 atms. to obtain a bottle having a height of 140 mm, a barrel diameter of 67.5 mm and a content of 380 ml.

Testing Method

① Preservation Test.

Ten empty bottles obtained by biaxially stretch-blowing a thermoplastic polyester were preserved under the conditions of 30° C. and 90% RH for three weeks. After preserved, the central portions in the bottom of the bottles were observed by eyes with respect to the occurrence of crazing and whitening. The results were expressed as the frequency of occurrence of the crazing and the whitening.

② Measurement of Axial Load.

A bottle obtained by biaxially stretch-blowing the thermoplastic polyester was filled with 350 ml of water and was sealed with a cap. The axial load strength of the bottle in the vertical direction was measured by using the TENSILON (UCT-5T)(manufactured by Orientek Co.) at a crosshead speed of 50.0 mm/min. to find the yield strength.

③ X-ray Measurement.

A central portion in the bottom of the bottle obtained by biaxially stretch-blowing the thermoplastic polyester was cut into a thickness of 1 mm and was measured for its diffraction peak by using a very small X-ray diffraction (PSPC-150C)(manufactured by Rigaku Denki Co.). The direction of the sample was such that the direction of thickness of the bottom portion was in the direction of height of the measuring surface.

The measurement was taken under the conditions of a tube voltage of 30 KV, a tube current of 100 mA, a collimator of 100 μm and a measuring time of 1000 seconds, and at three points, i.e., points separated away by 100 μm from the inner surface and from the outer surface, and at an intermediate point from the inner surface and from the outer surface. After the measurement, the integrated intensities were calculated over a range of from 10.071 degrees to 30.071 degrees, to find a peak position and a half-value width.

Example 1

Preforms having a weight of 20 g were molded by compression molding. The preforms possessed a uniform thickness in the barrel portion in the circumferential direction (max. thickness–min. thickness=0.07 mm or smaller), and were biaxially stretch-blow-molded to obtain bottles. The difference in the thickness (max. thickness–min. thickness) of the barrel portion of the bottles in the circumferential direction was about 0.06 mm or smaller. Preservation testing of the bottles proved that no crazing or whitening occurred on ten bottles, and the appearance was the same as before the preservation testing. Measurement of the axial load proved the yield strength to be 46.0 kgf satisfying properties required by the bottles for beverages.

Example 2

Preforms having a weight of 20 g were molded by the compression molding and the injection molding.

The preforms obtained by the compression molding included those having uniform thickness in the barrel portion in the circumferential direction (max. thickness–min. thickness=0.07 mm or smaller) and those having nonuniform thicknesses (max. thickness–min thickness=0.08 to 0.15 mm). The preforms obtained by the injection-molding all possessed uniform thickness in the barrel portion in the circumferential direction. These preforms were biaxially drawn and blow-molded to obtain bottles.

The bottles obtained from the preforms produced by the compression molding and having nonuniform thicknesses in the barrel portion in the circumferential direction, exhibited a difference in the thickness (max. thickness–min. thickness) in the barrel portion in the circumferential direction of from 0.15 to 0.06 mm, whereas the bottles obtained from other preforms exhibited a difference in the thickness of the barrel portion in the circumferential direction of not larger than about 0.06 mm.

These bottles were measured by using X-rays. The results were as shown in Table 1 below.

TABLE 1

| Preform molding method | Thickness of bottle in circumferential direction | Peak position (°) | | Difference in position (°) | Half-value width (°) | | Difference in half-value width (°) |
|---|---|---|---|---|---|---|---|
| | | Out (A) | In (B) | B − A | Out (C) | In (D) | C − D |
| Compression molding | uniform | 19.647 | 20.091 | 0.444 | 11.845 | 11.696 | 0.149 |
| Compression molding | nonuniform | 20.186 | 20.164 | −0.022 | 11.673 | 11.492 | 0.181 |
| Injection molding | uniform | 21.115 | 20.321 | −0.794 | 11.890 | 11.496 | 0.394 |

Comparative Example 1

Preforms having a weight of 20 g were molded by the injection molding. The obtained preforms were biaxially drawn and blow-molded to obtain bottles. After the preservation testing of the bottles, crazing of about 2 mm occurred in the central portion in the bottom of the four bottles, and whitening of a diameter of about 10 mm occurred in the other three bottles.

Comparative Example 2

Preforms of a weight of 20 g were molded by the compression-molding. The preforms possessed nonuniform thicknesses in the barrel portions in the circumferential direction (max. thickness−min. thickness=0.08 to 0.15 mm). The preforms were biaxially drawn and blow-molded to obtain bottles. The obtained bottles exhibited a difference in the thickness in the barrel portions in the circumferential direction (max. thickness−min. thickness) of from 0.15 to 0.06 mm. After the preservation testing of the bottles, crazing or whitening occurred in none of the ten bottles, and the appearance was the same as before the preservation testing. In the measurement of axial load, however, the yield strength was 30.2 kgf failing to satisfy the properties required by the bottles for beverages. The results of the preservation testing and of the measurement of axial loads were as shown in Table 2 below.

TABLE 2

| Preform molding method | Thickness of bottle in circumferential direction | Appearance | | Axial load (kgf) |
|---|---|---|---|---|
| | | Crazing | Whitening | |
| Compression molding | uniform | 0 | 0 | 46.0 |
| Compression molding | nonuniform | 0 | 0 | 30.2 |
| Injection molding | uniform | 4 | 3 | 53.0 |

The present inventors have succeeded in detecting the strain due to orientation by fluidization at the center in the bottom portion of the bottle, have molded the preform by subjecting the thermoplastic resin to the compression molding and, particularly, to the one-stage compression molding, so that the strain due to orientation by fluidization will not substantially occur, and have subjected the preform to the biaxial stretch-blow-molding, in order to produce a bottle having a bottom portion that is homogeneously and uniformly stretched, having little strain due to orientation by fluidization in the bottom portion and, as a result, exhibiting improved shock resistance and buckling strength in the bottom portion, featuring excellent resistance against environmental cracking at the center in the bottom portion, without developing crazing or whitening during the preservation, and offering excellent appearance.

What we claim is:

1. A bottle formed by biaxially stretch-blow-molding a thermoplastic resin and having a mouth portion, a shoulder portion, a barrel portion and a bottom portion, said bottom portion without being substantially affected by the residual strain due to orientation by fluidization, wherein the bottle is composed of a polyester and the central portion in the bottom portion of the bottle has a diffuse scattering peak in $2\theta$ of from 19.45 to 20.50° as measured by using X-rays (Cu-α) falling in the direction of thickness of the container wall, a peak position (A) at a portion on the outer surface side of the central portion in the bottom portion is an angle lower than that of a peak position (B) at a portion on the inner surface side of the central portion in the bottom portion, the difference (B−A) thereof is not smaller than 0.15 degrees, a half-value width (C) of the diffuse scattering peak of X-rays in the portion on the outer surface side at the central portion in the bottom portion is larger than a half-value width (D) of the diffuse scattering peak of X-rays in the portion on the inner surface side at the central portion in the bottom portion, and the difference (C−D) thereof is not smaller than 0.10 degrees.

2. A bottle according to claim 1, wherein said bottle is formed by biaxially stretch-blow-molding a preform that is formed by compression-molding a thermoplastic resin.

3. A bottle according to claim 2, wherein a difference (tmax−tmin) between a maximum thickness and a minimum thickness of the barrel portion of said preform in the circumferential direction is not larger than 0.07 mm.

4. A bottle according to claim 1, wherein the mouth portion has a support ring, and an annular groove is formed in the inner peripheral edge in the lower surface of the support ring.

\* \* \* \* \*